(12) United States Patent
Margraf, Jr. et al.

(10) Patent No.: US 10,391,684 B1
(45) Date of Patent: Aug. 27, 2019

(54) CAULS AND METHODS OF USING CAULS TO PRODUCE COMPOSITE ARTICLES

(71) Applicant: Spintech, LLC, Xenia, OH (US)

(72) Inventors: Thomas W. Margraf, Jr., Dayton, OH (US); Matthew C. Everhart, Fairborn, OH (US); David E. Havens, Bellbrook, OH (US); Robert V. Graziano, Pauma Valley, CA (US); Craig S. Jennings, Dayton, OH (US)

(73) Assignee: Spintech, LLC, Xenia, OH (US)

( * ) Notice: Subject to any disclaimer, the term of this patent is extended or adjusted under 35 U.S.C. 154(b) by 224 days.

(21) Appl. No.: 15/364,986

(22) Filed: Nov. 30, 2016

(51) Int. Cl.
*B29C 70/44* (2006.01)
*B29C 43/00* (2006.01)
*B29C 43/20* (2006.01)
*B29L 31/00* (2006.01)

(52) U.S. Cl.
CPC .......... *B29C 43/003* (2013.01); *B29C 43/203* (2013.01); *B29L 2031/731* (2013.01)

(58) Field of Classification Search
CPC .................... B29C 43/003; B29C 2031/731
See application file for complete search history.

(56) References Cited

U.S. PATENT DOCUMENTS

| | | | |
|---|---|---|---|
| 5,242,523 A | 9/1993 | Willden et al. | |
| 6,290,895 B1 * | 9/2001 | Wang | B29C 70/342 264/258 |
| 7,422,714 B1 * | 9/2008 | Hood | B29C 33/40 264/219 |
| 2005/0183818 A1 | 8/2005 | Zenkner et al. | |
| 2005/0211870 A1 * | 9/2005 | Browne | B29C 33/308 249/134 |
| 2012/0286457 A1 * | 11/2012 | Everhart | B29C 33/3857 264/531 |
| 2014/0265014 A1 * | 9/2014 | Morrow | B29C 70/44 264/230 |
| 2016/0158977 A1 * | 6/2016 | Ross | B29C 70/443 264/101 |

FOREIGN PATENT DOCUMENTS

EP    1092529 A1    4/2007

\* cited by examiner

*Primary Examiner* — Nahida Sultana
(74) *Attorney, Agent, or Firm* — Dinsmore & Shohl LLP (57) ABSTRACT

Cauls and methods of using cauls to produce composite articles are provided. The caul transitions from a rigid state to an elastomeric state and from an elastomeric state to a rigid state in response to a stimulus and has a reinforcement density of from 100 kg/m$^3$ to 500 kg/m$^3$. Methods of using cauls to produce composite articles involve positioning one or more fiber layers between a caul and a cure mold surface when the caul is in a rigid state. The fiber layers, caul, and cure mold surface may be covered with a sealed barrier and a pressure gradient may be applied. Before, after, or before and after performing the vacuum the fiber layers may be impregnated with resin. The fiber layers may be cured, which may provide a stimulus to transition the caul from a rigid to an elastomeric state, and the composite article is produced.

15 Claims, 3 Drawing Sheets

FIG. 3

CAULS AND METHODS OF USING CAULS TO PRODUCE COMPOSITE ARTICLES

TECHNICAL FIELD

Embodiments of the present disclosure generally relate to cauls and methods of using cauls to produce composite articles. More specifically, embodiments of the present disclosure relate to cauls that can transition from a rigid to an elastomeric state, and methods of using a caul that can transition from a rigid to an elastomeric state to produce composite articles.

BACKGROUND

In the field of composite manufacturing, specifically composite manufacturing using a caul tool, conventional methods for producing articles are unable to reliably produce complex objects with sharp corners, as rigid caul tools cannot apply uniform pressure and do not sufficiently press into the small, intricate areas of an article. This can result in resin-heavy corners and/or insufficient consolidation of the material around the edges of the resulting composite article. Conventionally, to overcome these difficulties, caul tools are made of items such as rubber and/or silicone to allow even pressure to be applied onto the curing composite article. However, these purely elastomeric caul tools progressively shrink with each repeated use, resulting in an imperfect fit with the composite part. Furthermore, purely elastomeric caul tools are not sufficiently rigid to allow for composite layup to be performed onto the caul tool. This requires composite lay-ups to be placed into rigid female mold cavities. In composite articles with complex geometries containing sharp radii and/or corners, this frequently results in bridging gaps and corner defects in the produced composite article.

SUMMARY

Accordingly, a need exists for a caul tool that can provide a rigid composite lay-up surface, provide uniform compaction pressure during the composite article cure, and can retain or recover its original dimensions and shape after multiple uses to produce composite articles, including complex geometry composite articles. The present embodiments address these needs by providing a caul and methods of using a caul that is operable to transition from a rigid state to an elastomeric state during composite article cure to allow fiber layers to be laid up on the rigid tool while additionally providing an elastomeric state to ensure sharp, precise features are produced in the resulting composite article.

In embodiments of the present disclosure, cauls comprising reinforcement material and polymer are provided. The caul is operable to transition from a rigid state to an elastomeric state in response to a first stimulus and is operable to transition from the elastomeric state to the rigid state in response to a second stimulus and has a storage modulus from about 1 gigapascals (GPa) to about 5 GPa in the rigid state and a storage modulus from about 1 megapascals (MPa) to 10 MPa in the elastomeric state. The caul may additionally have a reinforcement density of from about 100 kg/m$^3$ to about 500 kg/m$^3$.

In additional embodiments, methods of using a caul to produce a composite article are provided. The method includes positioning one or more fiber layers between a mold surface and the caul when the caul is in a rigid state (having a storage modulus of from 1 GPa to 5 GPa) and the caul includes reinforcement material and a polymer. The mold surface, caul, and one or more fiber layers are covered with a sealed barrier and a pressure gradient is applied across the enclosure barrier to compact the fiber layers. The fiber layers may be impregnated with uncured or partially cured resin before applying the pressure gradient, after applying the pressure gradient, or both. The uncured or partially cured resin may include organic polymer resin, inorganic polymer resin, thermoplastic resin, thermoset resin, and combinations thereof. The resin impregnated fibers may be cured at a temperature of greater than or equal to 120° F. and less than or equal to 500° F. to produce the composite article. The curing temperature may transition the caul from a rigid state (1 GPa to 5 GPa) to an elastomeric state (1 MPa to 10 MPa).

BRIEF DESCRIPTION OF DRAWINGS

The following detailed description of specific embodiments of the present disclosure can be best understood when read in conjunction with the following drawings, in which.

DETAILED DESCRIPTION

The present disclosure generally relates to caul tools and methods of using caul tools to produce composite articles. As used herein, a "caul" refers to a tooling apparatus used to translate pressure to compact material during fabrication of a composite article.

Embodiments of the present disclosure are directed to cauls comprising reinforcement material and polymer that are operable to transition from a hard, rigid state to a flexible, elastomeric state in response to a stimulus (such as heating or cooling). The cauls have a reinforcement density of from 100 kg/m$^3$ to 500 kg/m$^3$ and may be used to produce composite articles. This may allow for fiber layers to be laid up on the caul while the caul is in a rigid state, while still providing the precise compaction achieved by purely elastomeric cauls. Additionally, in some embodiments, the caul may be reusable and may continue to transition from a rigid to an elastomeric shape without losing surface area, unlike conventional rubber and silicone-based cauls.

Additional embodiments of the present disclosure are directed to methods of using the caul to produce composite articles. The method includes positioning fiber layers between a cure mold surface and a caul when the caul is in a hard, rigid state, covering everything with a sealed barrier and applying a pressure gradient to the sealed barrier. The fiber layers may be impregnated with uncured or partially cured resins before, after, or both before and after applying the pressure gradient. The resin impregnated fibers are then cured to produce the composite article. These methods may allow for intricate articles to be efficiently and cost-effectively produced by utilizing a reusable caul that has both a rigid and elastomeric state, which allows the fiber material to be laid up directly on the caul while still producing precise composite articles.

Specific embodiments will now be described with references to the figures. Whenever possible, the same reference numbers will be used throughout the drawings to refer to similar or like parts.

Figure 1:
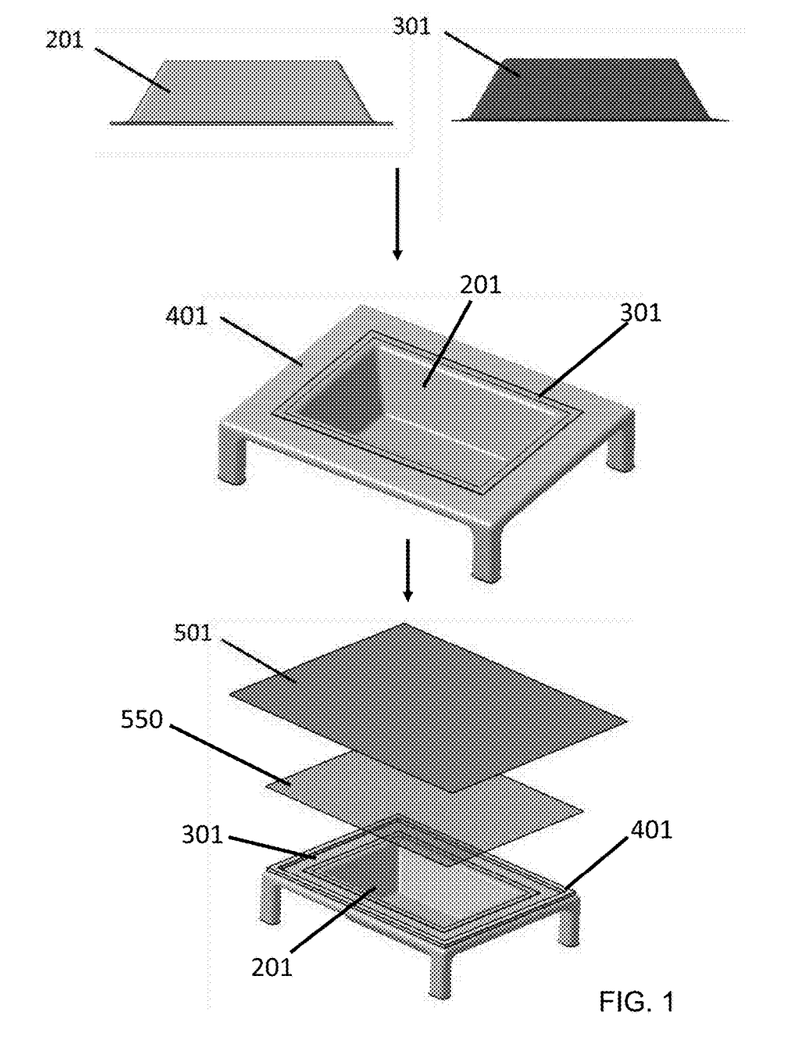
FIG. 1 is a schematic view of a process for producing a composite article using a caul as a rigid male layup surface inserted into a female cure mold surface according to embodiments described herein.

FIG. 1 depicts a process for producing a composite article using a caul 201 to compact one or more fiber layers 301. In some embodiments, the caul 201 may be comprised of a reinforcement material and a polymer. In some embodiments, the reinforcement material may contain one or more of elastic fiber, nylon fiber, lycra fiber, polyester fiber, carbon fiber, glass fiber, aramid fiber, boron fiber, basalt fiber, polymer fiber, random mats, scrims, chopped fibers, carbon nanofibers, particulate fillers, knits, unidirectional plies, three-dimensional weaves, three-dimensional fiber preforms, plain weave fabrics, twill fabrics, harness satin fabrics, or other type of textile fabric, and combinations thereof. A suitable commercial example of nylon fiber includes nylon produced by Invista (Wichita, Kans.). The caul 201 may, in some embodiments, contain two or more or three or more different types of reinforcement materials.

The caul 201 may have any suitable shape depending on the desired application of use. The caul 201, in some embodiments, may have a flat or curved geometry with various dimensions. The caul may have a thickness of, for example, from about 0.04 inches to about 0.188 inches. In some embodiments, the caul may have a tubular shape, a contiguous geometry, or a complex three-dimensional shape with corners having any various curvature. In these embodiments, the thickness of the caul with various shapes may again range from about 0.04 inches to about 0.188 inches. The length and width of the caul 201 may be any suitable length and width depending on the desired application of use. In some embodiments, the caul 201 may have a length or width as short as about 0.04 inches and as long as about 100 feet. In some embodiments, the caul 201 may have a length or width longer than 100 feet.

In some embodiments, the polymer of the caul 201 may include a thermoset or a thermoplastic polymer. The polymer may be a thermoset or thermoplastic shape memory polymer. The polymer may be an epoxy shape memory polymer, a cyanate ester shape memory polymer, a polyurethane shape memory polymer, a vinyl shape memory polymer, polyimide shape memory polymer and maleimide shape memory polymer, or combinations thereof, including copolymers. Without being bound by theory, the properties of the shape memory polymer may allow the polymer, and thus, the caul 201, to recover its shape, even in spite of extensive repeated use and, in some embodiments, various heating and cooling cycles.

In some embodiments, the caul 201 may have a reinforcement density of from about 100 kg/m$^3$ to about 500 kg/m$^3$ as calculated by the weight of the reinforcement material per volume of the caul 201. The caul 201 may have a reinforcement density of from about 150 kg/m$^3$ to about 400 kg/m$^3$, such as from about 200 kg/m$^3$ to 350 kg/m$^3$ or from 300 kg/m$^3$ to 400 kg/m$^3$. In some embodiments, the caul 201 may have a reinforcement density of from about 100 kg/m$^3$ to 400 kg/m$^3$, or from 175 kg/m$^3$ to 500 kg/m$^3$, or from 150 kg/m$^3$ to 450 kg/m$^3$, or from 175 kg/m$^3$ to 400 kg/m$^3$, or from 300 kg/m$^3$ to 500 kg/m$^3$, or 250 kg/m$^3$ to 500 kg/m$^3$. Without being bound by any particular theory, a reinforcement density of from about 100 kg/m$^3$ to about 500 kg/m$^3$ may provide a resin-rich caul 201 with a high degree of temporary deformation (the ability to stretch) which may allow the caul 201 to conform more easily and to apply uniform pressure despite tight corners and intricate details.

Without intent to be bound by any particular theory, the caul 201 may be used to compact one or more fiber layers 301 to produce a composite article 350. While the term "fiber layers" is used, it should be understood that non-fibrous materials are also suitable and contemplated for use. The one or more fiber layers 301 may comprise at least one of prepreg, carbon fiber, glass fiber, aramid fiber, polymer fiber, random mats, scrims, chopped fibers, knits, unidirectional plies, three-dimensional weaves, three-dimensional fiber preforms, plain weave fabrics, twill fabrics, harness satin fabrics, and combinations thereof. The fiber layers 301 may be matted into sheets and may comprise natural material, synthetic material, or combinations of these or other materials. The fiber layers 301 may be impregnated with uncured or partially cured organic or inorganic polymer resin, thermoplastic resin, or thermoset resin before applying the pressure gradient, after applying the pressure gradient, or both. In some embodiments, the method may utilize only one fiber layer 301, or may utilize multiple fiber layers 301. In some embodiments, the fiber layers 301 may be stacked together or may be laid up in any amount of layers. In some embodiments, the fiber layers 301 may be one layer, or may be comprised of 2 or more, or 3 or more layers. In some embodiments, the fiber layers 301 may comprise 5 or more layers, or 10 or more layers, or 20 or more layers, or 50 or more layers.

Referring again to FIG. 1, in some embodiments, dry fiber may be used as the one or more fiber layers 301. As used herein, "dry fiber" refers to a material that is not yet impregnated with polymer resin. The method may comprise generating a pressure gradient by applying vacuum with a vacuum pump, or by the use of a resin pump. Using the applied pressure gradient, the fiber layers may be impregnated with uncured organic or inorganic polymer resin, thermoplastic resin, or thermoset resin by resin infusion. The resin impregnated fiber layers are then cured by heating under pressure. The dry fiber layers may be in accordance with any of the materials used in the one or more fiber layers 301 as previously discussed. The dry fiber layers may comprise one or more of carbon fiber, glass fiber, aramid fiber, polymer fiber, random mats, scrims, chopped fibers, knits, unidirectional plies, three-dimensional weaves, three-dimensional fiber preforms, plain weave fabrics, twill fabrics, harness satin fabrics, and combinations thereof.

In other embodiments, "prepreg" or pre-impregnated fiber material containing polymer may be used. In some embodiments, the prepreg material may include an uncured or partially cured thermoset or thermoplastic polymer resin that was already infused or impregnated into the fiber material prior to the fiber layup step. In some embodiments, additional uncured resin may be infused into the prepreg material then the resin impregnated fiber layers may be cured by heating under pressure. The uncured resin may be an organic or inorganic polymer resin or a thermoset resin. In some embodiments, the resin may be a thermoplastic resin and may be thermoplastic prepreg. A suitable commercial example of thermoplastic prepreg is Flexile Thermoplastic Prepreg Products by Vector Systems (Holmen, Wis.).

As mentioned, the caul 201 may be used to compact the one or more fiber layers 301 into a formed composite article 350. As previously discussed, conventional caul tools are typically made of rigid material (such as metal) or are made of flexible material (such as rubber or silicone). However, a rigid caul tool cannot apply uniform pressure and does not sufficiently press into the small, intricate areas of the article, which can result in resin-heavy corners and/or insufficient consolidation of the material around the edges of the resulting composite article. Likewise, while a flexible elastomeric caul tool may produce more precise articles, it progressively shrinks with each repeated use, resulting in an imperfect fit with the composite part. Flexible elastomeric caul tools additionally are not rigid enough to allow for composite layup to be performed onto the caul tool, requiring composite lay-ups to be placed into rigid female mold cavities. In composite articles with complex geometries containing sharp radii and/or corners, this frequently results in fiber bridging gaps and corner defects in the produced composite article. The caul 201 of the present embodiments overcomes the difficulties experienced by conventional caul tooling by exhibiting both rigid and elastomeric characteristics and seamlessly transitioning from an rigid state to an elastomeric state and vice versa.

In some embodiments, the caul 201 may be operable to transition from a rigid state to an elastomeric state in response to a first stimulus. Likewise, the caul 201 may be operable to transition from an elastomeric state to a rigid state in response to the same or a second stimulus. In some embodiments, the stimulus may be temperature-dependent, such as heating and/or cooling the caul 201. In some embodiments, the first stimulus may be heating the caul 201 to transition the caul 201 from a rigid to an elastomeric state and the second stimulus may be cooling the caul 201 to transition the caul 201 from an elastomeric state to a rigid state.

The caul 201 may be heated or cooled through a variety of suitable means. For instance, the caul 201 may be heated using forced hot air heating, convection, conduction, exothermic reactions, microwave heating, inductive heating, or infrared radiation (IR), or any combination of known heating techniques. The caul 201 may be actively or passively cooled, for instance, by using forced cold air cooling, cooling coils, cool water, refrigerant, cooling zones, or by allowing the caul 201 to return to room temperature such as through exposure to ambient air.

When rigid, the caul 201 may have a storage modulus of from about 1 GPa to about 5 GPa. The caul 201 may have a storage modulus in the rigid state of from 1 GPa to 4 GPa, or from 2 GPa to 5 GPa, or from 3 GPa to 5 GPa, or from 1 GPa to 4 GPa, or from 1 GPa to 3 GPa. The caul 201 in a rigid state may have a storage modulus from 1 GPa to 2 GPa, or from 2 GPa to 3 GPa, or from 2 GPa to 4 GPa.

As used herein, "storage modulus," refers to a measurement of the stored energy in viscoelastic materials based on the below equation:

$$E' = \frac{\sigma_0}{\varepsilon_0}\cos\delta \qquad \text{EQUATION 1}$$

in which E' is the dynamic storage modulus, σ is the resultant stress, ε is the applied strain, and δ is the phase angle. Storage modulus is measured using a Dynamic Mechanical Analyzer (DMA), which applied a set oscillatory strain to a sample and measured the corresponding stress required with δ=0 to reduce the equation to E' =σ/ε.

As mentioned, the caul 201 may also be able to transition from the rigid state to an elastomeric state. In the elastomeric state, the caul 201 may have a storage modulus in the elastomeric state of from about 1 MPa to about 10 MPa. In some embodiments, the caul 201 may have a storage modulus in the elastomeric state of from 1 MPa to 8 MPa, or 1 MPa to 5 MPa, or from 3 MPa to 10 MPa, or from 5 MPa to 10 MPa. The caul 201 in the elastomeric state may have a storage modulus of from 2 MPa to 8 MPa, or from 3 MPa to 7 MPa, or from 3 MPa to 10 MPa, or from 1 MPa to 6 MPa. The storage modulus of the caul 201 in the elastomeric state may be significantly less than the storage modulus of the caul 201 in the rigid state ($10^3$ MPa=1 GPa) as higher storage modulus may generally correlate to a more rigid, structured material and lower storage modulus may generally correlate to a more elastic, flexible material. The caul is in a transitive state between 10 MPa and 1 GPa.

In some embodiments, the caul 201 may be in the rigid state below the glass transition temperature of the polymer that comprises the caul 201. In some embodiments, the caul 201 may be rigid at temperatures less than or equal to 265° F., such as less than or equal to 180° F., or less than or equal to 175° F., or less than or equal to 150° F., or less than or equal to 120° F., or less than or equal to 100° F. The caul 201 may be rigid from 0° F. to 265° F., or from 0° F. to 180° F., or from 0° F. to 120° F., or from 75° F. (about room temperature) to 265° F., or from 75° F. to 180° F. In some embodiments, the caul 201 may have a glass transition temperature of less than or equal to 265° F. such as less than or equal to 180° F. or less than or equal to 120° F.

Similarly, the caul 201 may be in the elastomeric state at temperatures above the glass transition temperature of the polymer comprising the caul. The caul 201 may be elastomeric at temperatures of greater than or equal to 120° F. The caul 201 may be in the elastomeric state at temperatures above 120° F., such as above 150° F., or above 180° F., or above 200° F., or above 225° F., or above 300° F., or about 350° F., or above 400° F. In some embodiments, the caul 201 may be in the elastomeric state at temperatures of from 120° F. to 500° F., or 120° F. to 425° F., or from 180° F. to 500° F., or from 180° F. to 400° F., or from 225° F. to 500° F. In some embodiments, it may be desirable to heat the caul 201 to an elastomeric state without exceeding a temperature of greater than or equal to 500° F., as the caul 201 composite may begin to melt or otherwise break down at too high of a temperature.

Referring again to FIG. 1, embodiments of the present disclosure include methods of using a caul 201 to produce composite articles. The method may include positioning one or more fiber layers 301 between a cure mold surface 401 and a caul 201 and covering the cure mold surface 401, the caul 201, and fiber layers 301 with an optional breathing layer 550 to allow air to move and/or escape and a sealed barrier 501. The one or more fiber layers 301 may be impregnated with uncured or partially cured resin, including organic polymer resin, inorganic polymer resin, thermoplastic resin, thermoset resin, and combinations thereof, before applying the pressure gradient, after applying the pressure gradient, or both. The resin impregnated fiber layers may be cured to produce the composite article 350.

The caul 201 and one or more fiber layers 301 may be in accordance with any of the embodiments previously described. The cure mold surface 401 may comprise any suitable material, including but not limited to polymer, glass, ceramic, carbon-carbon composite, fiber-reinforced polymer composite, metal, wood, polymeric foam, ceramic foam, glass foam, syntactic foam, carbon foam, metal foam, a sandwiched structure, a honeycomb sandwich structure, and combinations thereof. The cure mold surface 401 may be any surface on the mold, which may or may not encompass the entire mold structure. It should be understood that any suitable size and shape of the cure mold surface 401 may be utilized in accordance with the desired composite article 350 to be produced.

As mentioned, the one or more fiber layers 301 may be positioned between the caul 201 and a cure mold surface 401. In some embodiments, the fiber layers 301 may be positioned such that they are sandwiched between the cure mold surface 401 and the caul 201. As shown in FIG. 1, in some embodiments, the fiber layers 301 may be "laid up" on the caul 201. Laying up may refer to placing the one or more fiber layers 301 on a tool surface. In some embodiments, the tool surface may be the caul 201. In other embodiment, the tool surface may be the cure mold surface 401. In some embodiments, the one or more fiber layers 301 may be slightly tacky so as to adhere to the caul 201, or in some embodiments, an adhesive material or resin material may be used to adhere the one or more fiber layers 301 to the caul 201. In some embodiments, laying up may simply involve placing dry fiber onto the caul 201 without use of an adhesive substance, for example, tape.

The method may include covering the cure mold surface 401, the caul 201, and the one or more fiber layers 301 with a sealed barrier 501. The sealed barrier 501 may be any suitable barrier capable of achieving a sealed environment. The sealed barrier 501 may, for example, be a polymer vacuum bagging film, a container, or an elastomeric film which may include silicone, latex, rubber, or a synthetic rubber and fluoropolymer elastomer, such as Viton, commercially available from DuPont Performance Elastomers (Wilmington, Del.). The sealed barrier 501 may be affixed to the periphery of the mold using an adhesive material, including but not limited to chromate tape, adhesive, glue, tape, putty, silicone, Viton, or other known materials. The adhesive material may affix the sealed barrier 501 around the outer edges to form a sealed barrier. In some embodiments, the sealed barrier 501 may not need to utilize adhesive material to create a sealed environment.

In some embodiment, after the sealed barrier 501 is applied over the cure mold surface 401, a pressure gradient may be applied. In some embodiments, a vacuum or an autoclave (not shown) may be used to apply pressure onto the sealed barrier 501. In other embodiments an air compressor may be used to apply a pressure onto the sealed barrier 501. Applying a pressure to the sealed barrier 501 may produce a pressure gradient, such as from 1 pound per square inch (psi) to 500 psi across the sealed barrier. In some embodiments the applied pressure can range from 50 psi to 500 psi, from 100 psi to 500 psi, or from 100 psi to 300 psi, or from 20 psi to 50 psi, from 3 psi to 20 psi, or from 50 psi to 100 psi, or from 300 psi to 500 psi, or greater than 500 psi, such as from 500 psi to 1,000 psi.

After applying a pressure gradient across the sealed barrier 501, the resin impregnated fiber layers 301 may be cured. As previously described, the one or more fiber layers 301 may be impregnated with resin before or after the pressure gradient is applied, or in some embodiments, both before and after the pressure gradient is applied to the caul 201, the one or more fiber layers 301 and the cure mold surface 401. The fiber layers 301 may be cured using any suitable curing techniques, including but not limited to heating with oven, autoclave, infrared, and induction.

The one or more resin impregnated fiber layers 301 may be cured to a temperature of from 120° F. to 500° F. to produce a composite article 350. In some embodiments, the one or more resin impregnated fiber layers 301 may be cured by being heated at a temperature of greater than or equal to 120° F., such as greater than or equal to 140° F., greater than or equal to 180° F., or greater than or equal to 200° F., or greater than or equal to 225° F. The one or more resin impregnated fiber layers 301 may be cured at temperatures of from 120° F. to 500° F., or 120° F. to 425° F., or from 180° F. to 500° F., or from 180° F. to 425° F., or from 225° F. to 500° F. or from 225° F. to 425° F. In some embodiments, a temperature of above 120° F. may be required to cure the resin impregnated fiber layers 301 and a temperature over about 500° F. may begin to undesirably melt the fiber layers 301. In some embodiments, the temperature range may be adjusted based on the fiber layer material and the resin material used. Any suitable temperature range may be used to cure the resin impregnated fiber layers 301.

The curing step may provide a stimulus to transition the caul 201 from the rigid state to an elastomeric state. For instance, at an increased temperature, the caul 201 may be transitioned into an elastomeric state, as previously discussed. The elastomeric state of the caul 201 may allow the caul 201 to translate the pressure gradient into a uniform normal force applied to the one or more fiber layers 301 to properly shape the composite article 350 to fully conform to the intricate details of the cure mold surface 401. As used herein, "uniform" refers to a consistent, stable force applied along the entirety of the one or more fiber layers 301. As used herein, "normal force" refers to a force that is perpendicular to the surface of the one or more fiber layers 301 at any given point.

In some embodiments, for example, the caul 201 in an elastomeric state may be able to translate pressure into a tight corner from the pressure gradient to enable better compaction and shape conformance of the one or more fiber layers 301 in the corners of the cure mold surface 401. This elastomeric state of the caul 201 triggered by a first stimulus, such as the curing conditions, may allow the caul 201 to apply uniform pressure onto the resin impregnated fiber layers so that the fiber layers will conform to the cure mold surface 401 to produce the desired shape of the composite article 350 while minimizing the impact of caul 201 and cure mold surface 401 misalignment. As compared to conventional purely rigid tooling, the caul 201 of the present embodiments may be able to further consolidate the fiber layers during cure, producing composite articles 350 with a higher fiber density. In some embodiments, composite articles 350 having a high fiber density may provide improved mechanical performance over less-dense articles.

Figure 3:
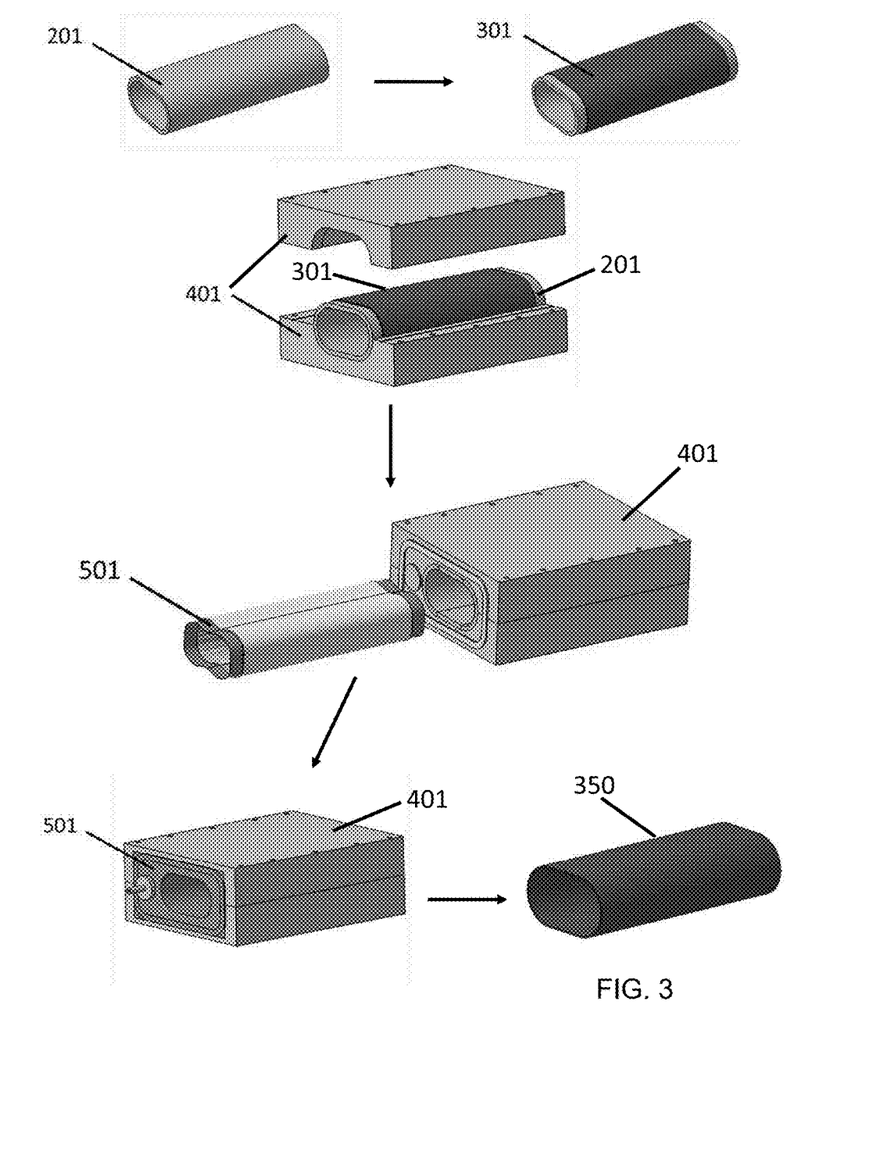
FIG. 3 is a schematic view of a process for producing a composite article using a contiguous 3-dimensional caul with tubular geometry according to embodiments described herein.

After the curing process, the sealed barrier 501 may be removed and the caul 201 may be disengaged from the produced composite article 350 and the cure mold surface 401. The produced composite article 350 may then be removed from the cure mold surface 401 to reveal the produced composite article 350. In some embodiments, the whole assembly, including the produced composite article 350, the caul 201, the cure mold surface 401, and/or the sealed barrier 501 may be cooled or allowed to cool before the produced composite article 350 is removed. The cooled and rigid caul in its molded shape may then be reused for fiber layup of another composite article. In other embodiments, a trapped geometry composite article 350 (as shown in FIG. 3) may require the caul 201 to be heated into an elastomeric state to be removed from the produced composite article 350. In such embodiments the caul 201 may be reformed to reset its geometry to the required shape by using a forming mold, a mold surface replicating the required lay-up geometry, or a produced composite article set into the cure mold surface 401. Like the cure mold surface 401, the forming mold may comprise any suitable material, including but not limited to polymer, glass, ceramic, carbon-carbon composite, fiber-reinforced polymer composite, metal, wood, polymeric foam, ceramic foam, glass foam, syntactic foam, carbon foam, metal foam, a sandwiched structure, a honeycomb sandwich structure, and combinations thereof. The caul 201 may be reused until significant surface degradation will result in unacceptable quality in the produced composite article 350. In some embodiments, the caul may be reused at least 50 times, at least 60 times, at least 80 times, or at least 100 times before surface degradation results in an unacceptable quality in the composite article 350. In some embodiments, the caul 201 may be reused (transitioned from a rigid state to an elastomeric and, optionally, back to a rigid state) from 10 to 80 times, or from 10 to 60 times, or from 20 to 60 times, or from 30 to 60 times, or from 20 to 100 times before producing a composite article 350 with unacceptable quality such as a composite article 350 with significant surface defect.

Figure 2:
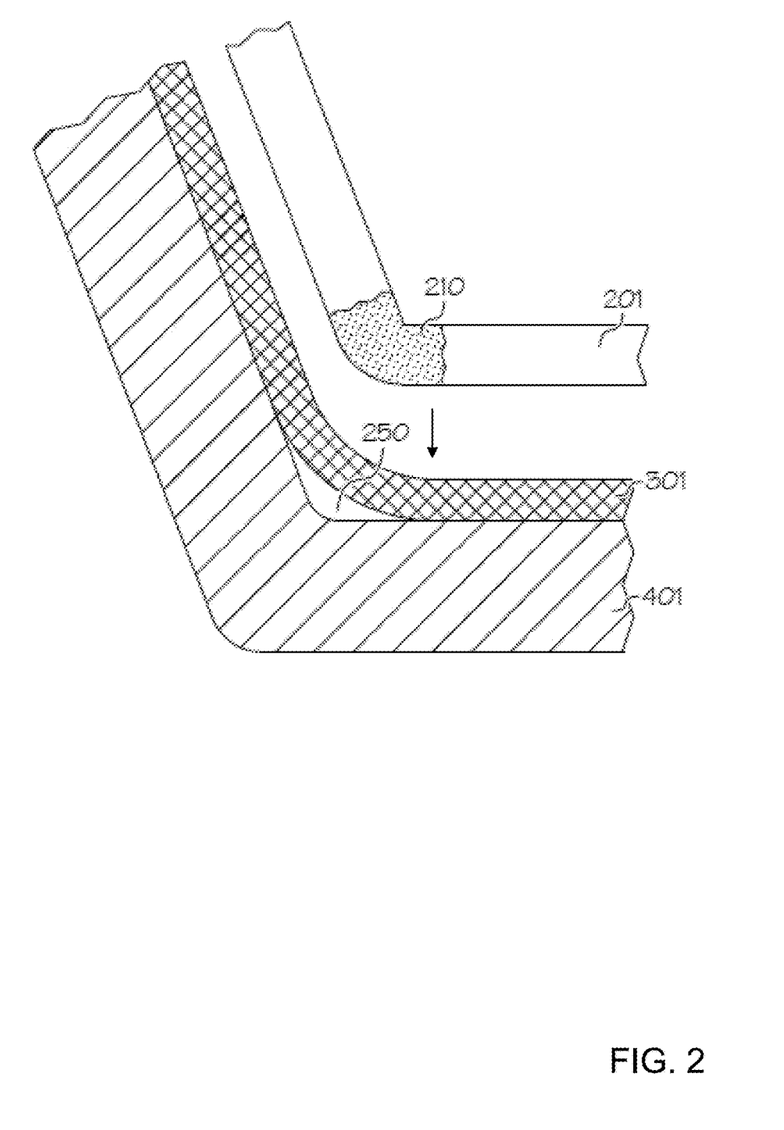
FIG. 2 is a schematic cross-sectional view of a caul with a stiffening section according to embodiments shown and described herein, which shows a cross-sectional view of the layup of a composite article to highlight a common fiber bridging problem experienced when applying pre-impregnated fiber layers into a female cavity cure mold surface with tight radius, included corners.

Referring now to FIG. 2, in some embodiments the cure mold surface 401 is a female cavity. In embodiments in which the cure mole surface 401 is a female cavity, the cure mold surface 401 may contain a tight radius with included corners, and conventional fabrication process would require an individual or machine to reach down into the mold and into the tight crevices to place the fiber layers 301 in the cure mold surface 401. It would be difficult for a conventional caul tool to prevent bridging gaps from occurring between any of the cure mold surface 401, the one or more fiber layers 301 and the caul 201. In embodiments of the present disclosure, the caul 201 is rigid at room temperature, as previously discussed, and thus may be used to provide a rigid layup surface for the one or more fiber layers 301. The caul 201 may be used as a male or female tool, and the same caul 201 may be used as both a male tool and a female tool depending on the desired application. Use of the caul 201 as a male layup surface provides the opposite geometry of the female cure mold surface 401 with unfettered access to the inverse tight radius with included corners. This allows the present embodiments to produce uniform, precise composite articles 350 with complex geometry and sharp corners. In the elastomeric state at elevated temperature, the caul 201 will also allow pressure to be uniformly applied across the entire cure mold surface 401 to compact the fiber layers 301 to produce composite article 350. In some embodiments, to ensure that the caul 201 applies a uniform pressure against the cavity of the mold cure surface 401 to form a composite article 350 with a precise, tight radius and included corners, stiffening sections 210 may be used.

The caul 201 in some embodiments may be fabricated with local areas of higher stiffness by incorporating rigid material and/or conventional pre-impregnated fiber layers. The stiffening sections 210 may be comprised of carbon fiber, glass fiber, quartz fiber, aramid fiber, boron fiber, basalt fiber, a metal insert, a plastic insert, a polymer composite insert, or combinations thereof. In some embodiments the stiffening section may have stiffness between 1,000 kilopounds per square inch (Ksi) and 10,000 Ksi. In other embodiments the stiffness can range from 10,000 Ksi to 30,000 Ksi, or from 100 Ksi to 1,000 Ksi. The stiffening section 210 may help to apply increased pressure into particular areas when producing a composite article 350. Stiffening sections 210 may be particularly beneficial when the composite article 350 has small, tight crevices or delicate, complex geometry that may be difficult to otherwise consolidate. Stiffening sections 210 may also provide positive registration of various geometric features between the caul 201 and the cure mold surface 401 during the curing process to ensure proper location and thickness control of features.

In producing irregularly shaped composite articles 350, such as those shown by the process of FIGS. 1 and 2, it may be easier and more efficient to layup directly on the caul 201 to ensure a complete, precise covering of the caul 201 with the fiber layers 301. This allows the present embodiments to produce uniform, precise composite articles 350. In other embodiments, the caul 201 may be a contiguous 3-dimensional geometry, like a tubular geometry, shown in FIG. 3.

FIG. 3 depicts another embodiment of a caul 201 being used in a method for producing composite articles 350. The method is similar to the embodiments described with reference to FIG. 1; however, the method shown in FIG. 3 utilizes a contiguous geometric caul 201 unlike the non-contiguous geometric caul 201 depicted in FIG. 1. As used herein, "contiguous" refers to geometry in which the caul 201 does not have opposing edges but rather has a continuous shape Likewise, as used herein, "non-contiguous" refers to a geometry in which the caul 201 has opposite edges that are not in contact with one another. When using a caul 201 having a contiguous geometry, as shown in FIG. 3, the sealed barrier 501 may be need to be passed through the hollow cavity of the caul 201 in order to properly seal to the cure mold surface 401. In other embodiments, a sealed barrier 501 may be achieved by passing a barrier though the hollow contiguous geometric caul 201, which may, in some embodiments, be sealed to a pressure source to establish a pressure differential. Suitable pressure sources may include, for instance, an air compressor, autoclave, or other similar pressure differential sources.

In some embodiments the caul 201 may be fabricated with integrated high tolerance locating inserts, rings, end fittings, or similar high tolerance articles, allowing for precision alignment with a cure mold surface, laser measuring system, laser assist fiber layer layup system, or similar systems requiring high tolerances. In some embodiments, the caul 201 may have an integrated high tolerance of about 0.003 inches. In other embodiments, the caul 201 may have an integrated high tolerance of about 0.005 inches or about 0.007 inches, such as from 0.003 inches to 0.005 inches or from 0.005 inches to 0.015 inches.

As described, the fiber layers 301 may be placed onto the cure mold surface 401 and/or the caul 201, and may be placed using any method known in the industry, including but not limited to manual, automated, or robotic stacking, laying, piling, loading, adhering, or other means of placing the one or more fiber layers 301 onto the cure mold surface 401 and/or the caul 201. In some embodiments, a primer or adhesive may be used to position the one or more fiber layers 301 in place. In other embodiments, the one or more fiber layers 301 may be slightly tacky, eliminating the need for a primer or adhesive. In some embodiments, the fiber layers 301 may be slightly tacky due to the impregnation of uncured resin in the fiber layers 301. The fiber layers 301 may be tacky due to a polymer or resin combined with the fiber layers 301.

In some embodiments, the caul 201 may be able to produce composite articles 350 despite variations in the layup of the one or more fiber layers 301. Conventional caul tools may jam if the material is not perfectly placed between the caul 201 and the cure mold surface 401; however, the cauls 201 of the present disclosure can overcome layup variations without misalignment issues. Particularly when utilizing more than one fiber layer 301 in the layup process, it can be difficult to perfectly place the layers in a uniform, even arrangement. The caul 201 of the present disclosure relaxes the stringent requirements of the one or more fiber materials 301 in the layup process to further simplify and expedite the process of producing a composite article 350 according to the embodiments described herein.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of using a caul to produce a composite article, comprising
    positioning one or more fiber layers between a cure mold surface and the caul,
        wherein the caul is in a rigid state, and the caul comprises a reinforcement material and polymer, and the rigid state is defined by a storage modulus from about 1 gigapascals (GPa) to about 5 GPa,
        wherein the reinforcement material comprises one or more elastic fibers, and
        wherein the polymer comprises one or more shape memory polymers;
    covering the cure mold surface, the caul, and the one or more fiber layers with a sealed barrier;
    applying a pressure gradient across the sealed barrier to compact the one or more fiber layers,
        wherein the one or more fiber layers are impregnated with uncured or partially cured resin selected from the group consisting of organic polymer resin, inorganic polymer resin, thermoplastic resin, thermoset resin, and combinations thereof, before applying the pressure gradient, after applying the pressure gradient, or both; and
    curing the resin impregnated fiber layers at a temperature of greater than or equal to 120° F. and less than or equal to 425° F. to produce the composite article,
        wherein the curing temperature transitions the caul from the rigid state to an elastomeric state, and the elastomeric state is defined by a storage modulus from about 1 megapascals (MPa) to 10 MPa.

2. The method of claim 1, wherein the one or more fiber layers are resin impregnated fiber layers that have been impregnated with uncured or partially cured organic or inorganic polymer resin, thermoplastic resin, or thermoset resin before positioning between the mold surface and the caul.

3. The method of claim 1, wherein the one or more fiber layers are dry fiber layers, and the method further comprises infusing the dry fiber layers with uncured organic or inorganic polymer resin, thermoset resin, or thermoplastic resin to impregnate the fiber layer with resin prior to curing the one or more fiber layers.

4. The method of claim 1, further comprising transitioning the caul from the elastomeric state back to the rigid state by cooling the caul to a temperature of less than 265° F. after curing the composite and reusing the caul by transitioning the caul from the cooled rigid state to a second elastomeric state by heating the caul to a temperature of greater than or equal to 120° F. and less than or equal to 425° F.

5. The method of claim 1, wherein the composite of the caul has a reinforcement density of from greater than or equal to 100 kg/m$^3$ to less than or equal to 500 kg/m$^3$.

6. The method of claim 1, wherein positioning the one or more fiber layers comprises laying the one or more fiber layers onto the cure mold surface, onto a surface of the caul, or both, prior to covering the cure mold surface, the caul, and the one or more fiber layers with the sealed barrier.

7. The method of claim 1, wherein the one or more fiber layers comprise one or more components selected from the group consisting of prepreg, carbon fiber, glass fiber, aramid fiber, polymer fiber, random mats, scrims, chopped fibers, knits, unidirectional plies, three-dimensional weaves, three-dimensional fiber preforms, plain weave fabrics, twill fabrics, harness satin fabrics, and combinations thereof.

8. The method of claim 1, wherein the caul further comprises at least one stiffening section that translates the pressure gradient from a pressure differential source to the one or more fiber layers.

9. The method of claim 8, wherein the pressure differential source comprises an autoclave, a vacuum source, an air compressor, or combinations thereof.

10. The method of claim 8, wherein the at least one stiffening section has a stiffness between 1,000 and 10,000 kilopounds per square inch (Ksi).

11. The method of claim 8, wherein the at least one stiffening section comprises one or more components selected from the group consisting of carbon fiber, glass fiber, quartz fiber, aramid fiber, boron fiber, basalt fiber, a metal insert, a plastic insert, a polymer composite insert, and combinations thereof.

12. The method of claim 1, further comprising heating or cooling at least the cure mold surface, the caul, and the composite article to disengage the produced composite article from the cure mold surface and the caul.

13. The method of claim 1, further comprising positioning one or more fiber layers onto the caul surface to from an assembly before placing the assembly into the cure mold.

14. The method of claim 1, wherein the shape memory polymer comprises one or more components selected from the group consisting of thermoplastic shape memory polymers, thermoset shape memory polymers, epoxy shape memory copolymers, cyanate ester shape memory polymers, polyurethane shape memory polymers, vinyl polymer shape memory polymers, and combinations thereof.

15. The method of claim 1, wherein the elastic fiber comprises nylon fiber, lycra fiber, or combinations thereof.

* * * * *

UNITED STATES PATENT AND TRADEMARK OFFICE
CERTIFICATE OF CORRECTION

PATENT NO. : 10,391,684 B1
APPLICATION NO. : 15/364986
DATED : August 27, 2019
INVENTOR(S) : Thomas W. Margraf et al.

It is certified that error appears in the above-identified patent and that said Letters Patent is hereby corrected as shown below:

In the Claims

Column 12, Line 53, Claim 13:
"one or more fiber layers onto the caul surface to from an"
Should read:
--one or more fiber layers onto the caul surface to form an--.

Signed and Sealed this
Nineteenth Day of May, 2020

Andrei Iancu
*Director of the United States Patent and Trademark Office*